United States Patent [19]

Aluisi

[11] Patent Number: 4,644,842

[45] Date of Patent: Feb. 24, 1987

[54] COMPOUND DRUM BEATER

[76] Inventor: Alan L. Aluisi, 4359 Batavia, Denver, Colo. 80220

[21] Appl. No.: 814,507

[22] Filed: Dec. 30, 1985

[51] Int. Cl.[4] .............................................. G01D 13/02

[52] U.S. Cl. .............................................. 84/422 R

[58] Field of Search .......................... 84/422 R, 422 C

[56] References Cited

U.S. PATENT DOCUMENTS

| | | | |
|---|---|---|---|
| 1,782,247 | 11/1930 | Verrecchia | 84/422 R |
| 2,484,302 | 10/1949 | Laverents | 84/422 R |
| 2,658,421 | 11/1953 | Clayton | 84/422 R |
| 4,188,853 | 2/1980 | Bills | 84/422 R |

*Primary Examiner*—Michael L. Gellner
*Assistant Examiner*—Brian W. Brown
*Attorney, Agent, or Firm*—Bruce G. Klaas; William P. O'Meara

[57] ABSTRACT

A drum beater assembly for striking a base drum or the like comprising a support base for supporting various beater assembly components, a rotatable shaft journalled to the support base for providing oscillatory rotational movement in a first rotational direction and a second rotational direction, a rotatable shaft bias means for biasing the rotatable shaft in the second rotational direction, a foot pedal pivotally mounted on the support base and operably linked to the rotatable shaft for rotating the rotatable shaft in the first direction in response to downward pressure on the foot pedal, a first beater means operably associated with the rotatable shaft for striking an adjacently positioned drum head a first strike in response to initial downward movement of the foot pedal, a second beater operably associated with the rotatable shaft means for striking the adjacently positioned drum head a second strike closely spaced in time with the first strike in response to continued downward movement of the foot pedal.

20 Claims, 5 Drawing Figures

COMPOUND DRUM BEATER

BACKGROUND OF THE INVENTION

The present invention is directed to a drum beater assembly and, more particularly, to a foot pedal actuated drum beater assembly adapted to provide multiple strikes to an adjacent drum head through application of pressure in a single direction to a beater assembly foot pedal.

A number of drum beater assemblies directed to producing multiple drum strikes during a single up-down actuation cycle of a drum beater foot pedal are described in the prior art.

Bills U.S. Pat. No. 4,188,853 discloses a double acting drum beater device having a beater adapted to strike an adjacent drum head once for each downward movement of a foot operated pedal, and then a second time during the subsequent upward movement of the pedal.

Laverents, U.S. Pat. No. 2,484,302 discloses a rockable foot pedal adapted for alternate heel and toe action to oscillate a rotating shaft in different directions. The rotating shaft has two beaters attached thereto, one adapted to strike a drum in response to toe pressure, the other adapted to strike the drum in response to heel pressure.

Clayton, U.S. Pat. No. 2,658,421 discloses a base drum construction including a bass drum, a base, a foot pedal pivotally mounted on the base, a horizontally disposed rocker shaft mounted for oscillation on the base and linked to the foot pedal enabling rotation in one direction in response to downward movement of the foot pedal and being biased in an opposite direction by a coil spring which also returns the foot pedal to an up position when pressure from a drummer's foot is released. A pair of upwardly extending beaters and a pair of downwardly extending beaters are attached to the oscillating shaft in an arrangement such that both upwardly positioned beaters strike the drum head simultaneously when the foot pedal is depressed and, when the pedal is released, both downwardly positioned beaters strike the drum on the afterbeat.

Such prior art devices are generally adapted to providing a drum strike on the afterbeat, i.e., between primary beats, which is accomplished by counter rotation of a beater shaft during the upward movement of the toe portion of a drummer's foot pedal. Such devices are not adapted for readily providing a flam effect, i.e., a pair of drum strikes in quick succession where the first drum strike acts as a grace note to the second drum strike, or for producing a drum pop, i.e., a pair of drum strikes following one another in such close succession that only a single sharp resonant note is heard by the listener. The reason that such prior art devices are not capable of readily producing flams or pops is that the drummer's foot must change direction in order to produce the multiple drum strike with such prior art devices, i.e., the first drum strike is produced by downward toe movement and the second drum strike is produced by upward toe movement or downward heel movement depending on the type of drum pedal assembly. Such a rapid change in foot pedal direction is impossible or nearly impossible physically due to the rapid shift in momentum of the drum beaters and pedal assembly and the drummer's foot which would be required for producing high speed multiple strike effects, such as flams and pops.

SUMMARY OF THE INVENTION

The present invention is directed to a multiple strike drum beater capable of producing high speed multiple strike effects, such as controlled flams and pops as well as slower speed multiple strikes and single strikes during a single downward movement of a foot pedal portion of the drum beater assembly.

The invention may comprise a drum beater assembly for striking a base drum or the like comprising support base means for supporting various beater assembly components; rotatable shaft means journalled to said support base for providing oscillatory rotational movement in a first rotational direction and a second rotational direction; foot pedal means pivotally mounted on the support base and operably linked to the rotatable shaft means for rotating the rotatable shaft means in the first direction in response to downward pressure on the foot pedal means; a first beater means operably associated with the rotatable shaft means for striking an adjacently positioned drum head a first strike in response to initial downward movement of said foot pedal means; a second beater means operably associated with the rotatable shaft means for striking the adjacently positioned drum head a second strike closely spaced in time with the first strike in response to continued downward movement of the foot pedal means.

The present invention enables a drummer to provide multiple strikes in rapid succession or in slower succession by varying foot pressure on the drum pedal during a single downward movement of the drum pedal. If desired, the drummer may produce only a single strike during downward movement of the drum pedal. The invention is adapted to be adjustable to facilitate varying the attack sequence spacing needed to produce a double drum strike and thus may be readily adjusted to enable a drummer to produce controlled pops, flams or slower multiple drum strikes or single drum strikes depending upon the drummer's particular style of pedal operation and depending upon the tempo of the music being played.

DETAILED DESCRIPTION OF THE INVENTION

Figure 1:
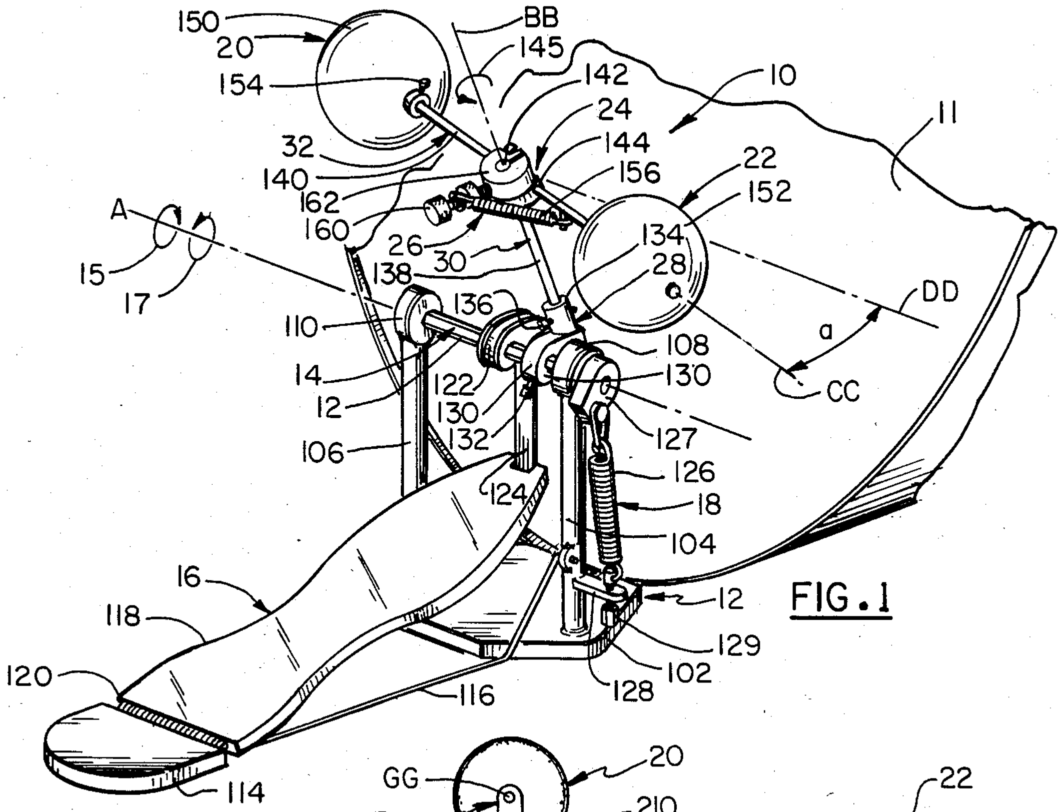
FIG. 1 is a perspective view of a drum beater assembly of the present invention.
Figure 3:
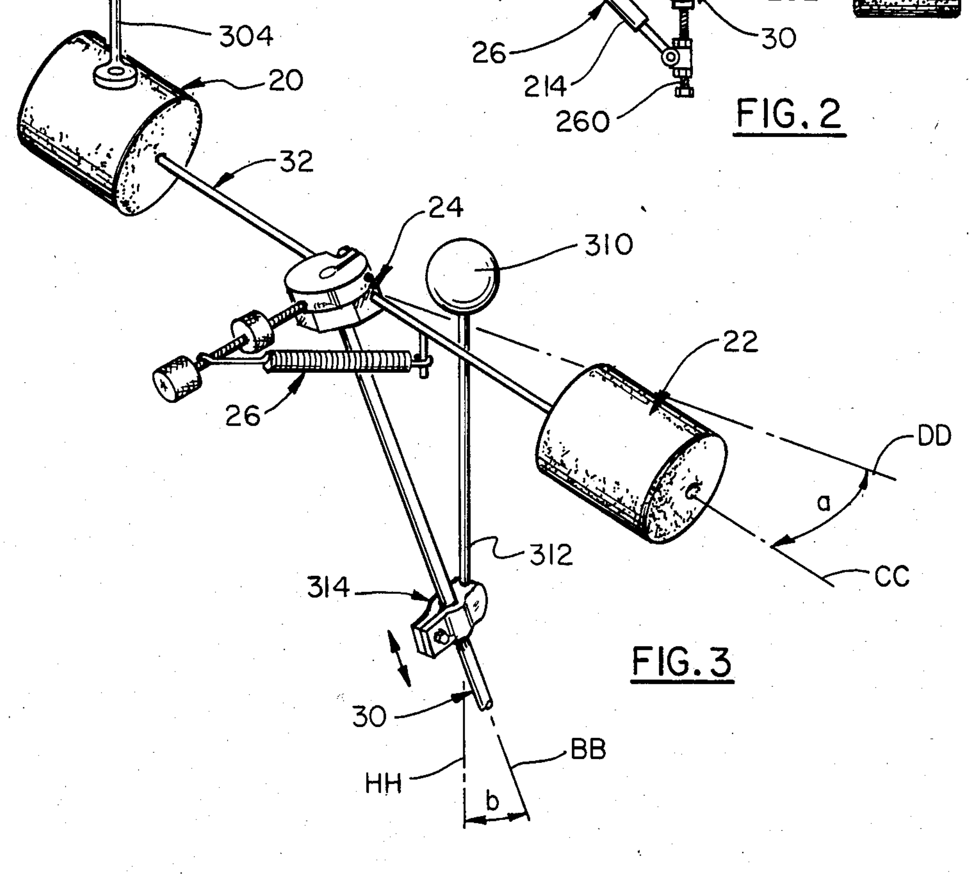
FIG. 3 is a partial perspective view of another embodiment of a drum beater assembly of the present invention.
Figure 4:
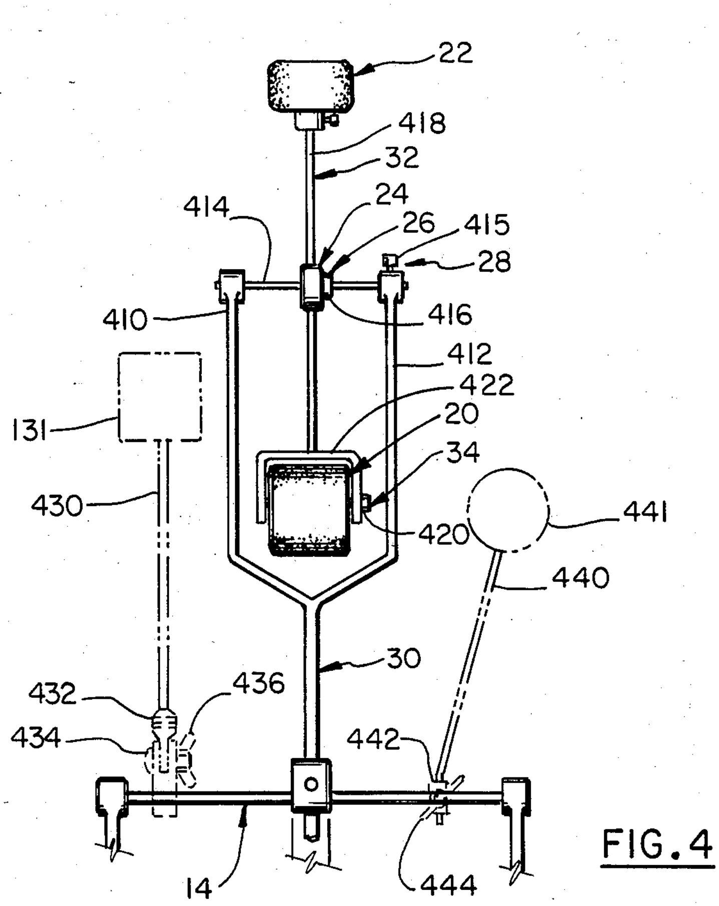
FIG. 4 is a partial front elevation view of another embodiment of a drum beater assembly of the present invention.

As illustrated in FIG. 1, the drum beater assembly 10 of the present invention is adapted for striking single or multiple blows to an adjacent drum head 11 during downward movement of an associated foot pedal portion of the drum beater assembly. In general, the drum beater assembly comprises a support base means 12 for supporting various beater assembly components; a rotatable shaft means 14 journalled to support base means 12 for oscillating rotational movement about its central longitudinal axis AA in a first rotational direction 15 and a second rotation direction 17; a foot pedal means 16 pivotally mounted on the support base means and operably linked to the rotatable shaft means for rotating the rotatable shaft means in first direction 15 in response to downward pressure on the foot pedal means; a rotatable shaft biasing means 18 for biassing the rotatable shaft means in its second rotational direction 17; a first beater means 20 operably associated with the rotatable shaft means 14 for striking the adjacently positioned drum head 11 a first strike in response to initial downward movement of the foot pedal means; and a second beater means 22 operably associated with the rotatable shaft means for striking the adjacently positioned drum head a second strike closely spaced in time with the first strike in response to a continued downward movement of the foot pedal means. A beater relative displacement means 24 is provided for enabling relative displacement of the first beater means 20 with respect to the second beater means 22 during the period between the striking of the drum head by the first beater means and the striking of the drum head by the second beater means. The invention may further comprise a beater means biasing means 26 for maintaining the first and second beater means 20, 22 in a preselected relatively fixed relationship with respect to one another prior to the first beater means striking the drum head and for biasingly returning the first and second beater means to the predetermined relatively fixed relationship when downward pressure on the foot pedal is released subsequent to the second beater means striking the drum head. The invention may further comprise beater means adjustment means 28 for adjusting the spacing between the first beater means 20 and the second beater means 22 in a direction perpendicular to the drum head, such that the amount of rotation of the rotatable shaft means 14 during the period between which the first beater means strikes the drum head and the second beater means strikes the drum head is selectively variable. In some embodiments, both the first and second beater means 20, 22 may be mounted on a single transverse member means 30, e.g., FIGS. 1–5 exclusive of the material shown in phantom. In one such arrangement as shown in FIG. 1 the two beater means may be pivotally mounted on the unitary transverse member means 30 on a beater pivotal member means 32. Alternately a first beater means may be mounted on a plunger assembly affixed to the transverse member with the other beater means mounted directly on the transverse member means. In a somewhat different embodiment, the first and second beater means may be provided on separate transverse members 430, 440, such as shown in phantom in FIG. 4. The drum beater assembly 10 may also be adapted to provide more than two drum strikes during a single downward excursion of the foot pedal by association of further beater means with the rotatable shaft biasing means 18, such as illustrated in the embodiments of FIGS. 3 and 4 (wherein the members shown in phantom and the members shown in solid lines in FIG. 4 are both used at the same time). First beater means rolling support means 34, FIGS. 2 and 4, may be used for rollingly mounting the first beater means on an associated mounting assembly to enable the first beater means to roll across the face of the drum head rather than sliding across the face of the drum head during the period of time between which the first beater means strikes the drum head and the second beater means strikes the drum head to prevent a frictional scuffing contact between the first beater means and the drum head during this interval.

Having thus described the invention in general, various specific embodiments of the invention will now be described in further detail. As illustrated in FIG. 1, the support base means 12 may comprise a horizontal base plate 102 having a pair of vertical post members 104, 106 fixedly mounted thereon, each post member having an enlarged boss portion 108, 110 at the upper end thereof adapted for accepting the rotatable shaft means. The support base means may further comprise a smaller stationary plate portion 114 connected to the larger base portion 102 as by an elongate connection member 116.

The rotatable shaft means 14 may comprise a horizontally disposed shaft 112 journalled in the boss portions 108, 110 of the support base vertical post members.

The foot pedal means 16 may comprise a pivotal pedal portion 118 connected at a lower terminal end thereof by a pivotal hinge assembly 120 to the smaller stationary plate portion 114. The pivotal pedal 118 may be connected to the horizontally disposed shaft 112 by conventional linkage means such as a shaft coupling member 122 fixedly mounted on shaft 112 and a leather strap 124 attached to a radially outwardly extending portion of the coupling member 122 and to an upper end portion of the pivotal pedal 118.

The rotatable shaft biasing means 18 may comprise a conventional coil spring 126 attached at one end to a radially offset portion of a shaft coupling member 127 fixedly attached to the shaft 112. The end of the spring 126 distal the coupling member 127 may be attached as by tension adjustment screw 129 to base connecting link 128 fixedly mounted on a lower portion of vertical post 108. A stop member (not shown) may be positioned on an upper portion of post 104 to engage coupling member 127 to limit the rotational movement of horizontal shaft 112 in direction 17, or hinge 120 may be constructed to limit upward movement of pedal 118 or other conventional stop means may be used.

Unitary transverse member means 30 may comprise a shaft 138 having an axis BB aligned generally perpendicular to axis AA of the rotatable shaft means. The shaft 138 may be mounted in a shaft coupling member 130 fixedly adjustably attached to horizontally disposed shaft 112 as by set screw 132. The coupling member 130 may have a transverse shaft receiving sleeve 134 provided with a set screw 136 for enabling both longitudinal and rotational adjustment of shaft 138 therewithin. The beater pivotal member means 32 may be mounted on the outer end portion of transverse shaft 138. In the embodiment illustrated in FIG. 1, shaft 138 comprises a threaded terminal end portion 142 and the beater pivotal member means 32 comprises a threaded nut 144 which is rotatable upon the threaded portion 142. The interface of the threaded portion 142 with the unthreaded portion of the shaft 138 serves as a stop means for limiting rotation of the nut about axis BB in the direction indicated at 145. Other pivotal rotation and stop means well known in the art may also be employed as an alternative to threaded nut 144 and threaded end portion 142. An elongate member 140 having a central longitudinal axis CC oriented generally perpendicular to axis BB is fixedly mounted on threaded pivotal nut member 144 and supports first and second beater means 20, 22 at either end thereof. In the embodiment illustrated, the beater means 20, 22 may each comprise a round wooden beater member 150, 152 mounted on the elongate member 140 as by a sleeve and set screw assembly 154 enabling adjustable axial placement of the beaters 152, 154 along axis CC.

Beater means biasing means 26 may comprise a biasing spring 156 attached at one end to shaft 140 and attached at the opposite end to tension adjustment screw 160. Screw 160 is in turn mounted on end cap member 162 which is fixedly mounted as by a conventional set screw to the terminal end portion of transverse shaft 138 above threaded nut 144.

It will be appreciated that by rotational adjustment of transverse shaft 138 within sleeve portion 134 axis CC of pivotal member 140 may be relatively adjusted with respect to an axis DD intersecting axis CC and positioned in generally parallel relationship to axis AA and the drum head surface 11. By maintaining the angle "a" between axis CC and DD relatively small, e.g. 10; two very closely spaced drum strikes may be provided even with relatively moderate pressure and speed being applied to foot pedal means 16. With a relatively larger angle "a," a relatively longer period may be provided between the drum strikes of beaters 20 and 22, assuming the downward foot pedal speed applied by the drummer is the same. It will also be appreciated that by extending transverse shaft 138 axially within sleeve 134 the relative power delivered to the drum head may be increased by use of a longer moment arm. Thus the beater assembly is extremely adaptable to the foot pressure and drumming styles of different drummers, etc.

Figure 2:
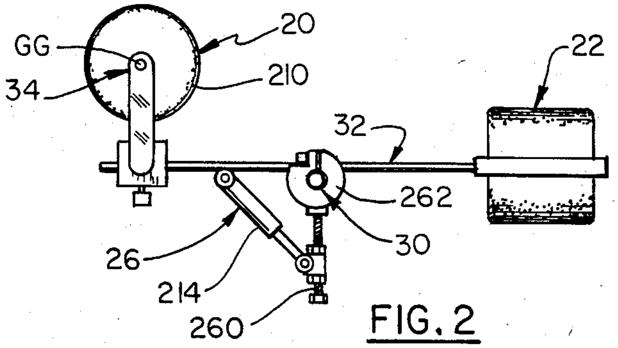
FIG. 2 is a top plan view of a portion of an alternate embodiment of a drum beater assembly of the present invention.

As illustrated in FIG. 2, first beater means 20 may comprise a cylindrical member 210 mounted on a rolling support structure 212 having an axis GG extending generally parallel to the axis of unitary transverse member means 30. The beater means biasing means 26 in FIG. 2 comprises a conventional pneumatic cylinder 214 having a preset pressure which is attached to beater pivotal member means 32 at one end and to adjustment screw 260 at an opposite end. Adjustment screw 260 may in turn be mounted on an end cap 262 which is fixedly adjustably attached to the end of transverse member means 30.

As illustrated in FIG. 3, additional preliminary strike beaters may be provided which strike the drum head prior to first and second beater means 20, 22. In the embodiment illustrated in FIG. 3, a first preliminary strike beater 302 is attached to beater means 20 by flexible shaft 304. A second preliminary strike beater 310 is mounted on a flexible shaft 312 which is in turn mounted on an axially adjustable connector sleeve 314. Shaft 312 comprises a central longitudinal axis HH intersecting axis BB at an angle "b" which is sufficiently great to enable beater or 310 to strike the drum head before first beater means 20 and which is sufficiently small such that beater 310 strikes the drum head after first preliminary beater 302. In other words, the striking order of the assembly shown in FIG. 3 is first preliminary beater 302, next preliminary beater 310, thereafter beater means 20, and thereafter beater means 22. Beater head 310 is sufficiently small and sufficiently offset by sleeve 314 from transverse shaft means 30 to prevent interfering with the movement of transverse shaft means 30 towards the drum head.

The portion of FIG. 4 shown in solid lines depicts a unitary transverse member 30 having fork member portions 410, 412 between which a horizontal member 414 parallel to rotatable shaft means 14 is adjustably fixedly mounted as by set screw 415. A beater pivotal member means 32 such as generally vertically oriented shaft 418 is rotatably mounted on shaft 414 and biased at a particular orientation thereon as by torsion spring 416. A horizontally disposed mounting shaft 420 is provided in a bracket portion 424 at one end of shaft 418 for enabling rotational mounting of the first beater means 20 thereon. In operation, the relative angular position of shaft 418 is such that beater means 20 strikes the drum in advance of beater means 22. In an alternate embodiment, which may be provided in cooperation with, or in lieu of, the transverse member means with forks 410, 412, a pair of beaters 431, 441 are mounted on separate shafts 430, 440 operably associated with rotatable shaft means 414. Shaft 430 may be a rigid shaft which is flexibly attached as by rubber boot 432 to an adjustable shaft coupling member 434 having adjustment screw 436. Beater 441 may be mounted on a flexible shaft 440 mounted on an adjustable shaft coupling member 442 having wing nut 444. The striking order of the beaters 431, 441 may be adjusted by rotational movement of the associated coupling members 434, 442 thus, for example, 431 may be adjusted to strike in advance of 441 and, when beaters 431 and 441 are used with the fork assembly, the coupling members may be adjusted to enable beaters 431 and 441 to strike the drum prior to first beater means 20.

Figure 5:
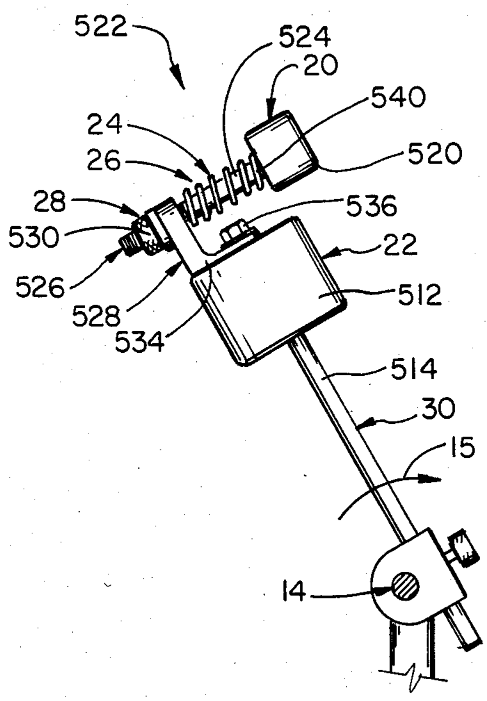
FIG. 5 is a partial side elevation view of another embodiment of a drum beater assembly of the present invention.

In the embodiment illustrated in FIG. 5, second beater means 22 may be a cylindrical beater 512 mounted directly on a terminal end portion of transverse shaft 514 and first beater 20 may comprise a cylindrical beater 520 slidably mounted on a plunger assembly 522 including a plunger shaft 524 with a threaded end portion 526 slidingly received through a hole in bracket upper portion 528 and adjustably held at the position shown as by nut 530 and the bias force of spring 540. An integral bracket lower portion 534 may be attached as by nut 536 to the terminal end of shaft 514. Biasing spring 540 mounted in helical relationship around plunger shaft 524 biases beater 520 outwardly. In operation, unitary transverse member 30 is pivoted in direction 15 by rotational movement of rotatable shaft means 14 in response to downward pressure on an associated foot pedal means. After striking the drum head, beater means 520 is moved rearwardly relative shaft 524 by continued pressure on the foot pedal means until second beater means 22 strikes the drum. By changing the axial position of shaft 524, the first beater means may be adjusted relative the second beater means to cause longer or shorter delay between the successive drum strikes of the first and second beater means.

In the embodiments of FIGS. 2–5 support base means 12, rotatable shaft means 14, foot pedal means 16 and rotatable shaft biasing means 18 identical to that in FIG. 1 may be used.

It is contemplated that the inventive concepts herein described may be variously otherwise embodies and it is intended that the appended claims be construed to include alternative embodiments of the invention except insofar as limited by the prior art.

What is claimed is:

1. A drum beater assembly for striking a base drum or the like comprising:

support base means for supporting various beater assembly components;

rotatable shaft means journalled to said support base for providing oscillatory rotational movement in a first rotational direction and a second rotational direction;

foot pedal means pivotally mounted on said support base and operably linked to said rotatable shaft means for rotating said rotatable shaft means in said first direction in response to downward pressure on said foot pedal means;

a first beater means operably associated with said rotatable shaft means for striking an adjacently positioned drum head a first strike in response to initial downward movement of said foot pedal means;

a second beater means operably associated with said rotatable shaft means for striking said adjacently positioned drum head a second strike closely spaced in time with said first strike in response to continued downward movement of said foot pedal means.

2. The invention of claim 1 further comprising:

rotatable shaft biasing means for biasing said rotatable shaft means in said second rotational direction whereby said first and second beater means are non-strikingly displaced from said adjacent drum head when downward pressure on said foot pedal means is released.

3. The invention of claim 2 further comprising:

beater means relative displacement means for enabling relative displacement of said first beater means with respect to said second beater means between said first strike and said second strike.

4. The invention of claim 3 further comprising:

beater means biasing means for maintaining said first and second means in a preselected relatively fixed relationship with respect to one another prior to said first strike and for biasingly returning said beater means to said predetermined relatively fixed relationship subsequent to said second strike.

5. The invention of claim 4 further comprising:

beater means adjustment means for adjusting the spacing between said first beater means and said second beater means for defining said preselected relatively fixed relationship whereby the amount of rotation of said rotatable shaft means between said first strike and said second strike is selectively variable by said spacing adjustment.

6. The invention of claim 4 further comprising:

unitary transverse member means for mounting said first beater means and said second beater means on said rotatable shaft means in transversely spaced relationship therefrom.

7. The invention of claim 6 wherein said beater means relative displacement means comprises:

beater pivotal member means having a first end portion and a second end portion and an intermediate portion and having said first beater means mounted on said first end portion and having said second beater means mounted on said second end portion and being pivotally mounted at said intermediate portion thereof on said unitary transverse member means.

8. The invention of claim 7 wherein said beater means biasing means comprises spring means operably connected to said beater pivotal member means in adjustable tensioning relationship therewith.

9. The invention of claim 8 wherein said beater means adjustment means comprises adjustable stop means for limiting the pivotal movement of said beater pivotal member means in the direction of biasing force applied by said spring means.

10. The invention of claim 9 wherein said transverse member is axially adjustable displaceable along a central longitudinal axis thereof relative said rotatable shaft means.

11. The invention of claim 9 wherein said transverse member is rotatably adjustable about a central longitudinal axis thereof.

12. The invention of claim 9 wherein said beater means are relatively axially adjustable with respect to a central longitudinal axis of said beater pivotal member means whereby the axial distance between said beater means is selectively adjustable.

13. The invention of claim 7 wherein said beater means biasing means comprises pneumatic cylinder means.

14. The invention of claim 6 wherein said first beater means is mounted on a plunger assembly extending transversely of said transverse member and wherein said second beater means is mounted on said transverse member.

15. The invention of claim 4 wherein said first beater means is mounted on a first elongate member disposed transversely of said rotatable shaft means and fixedly connected thereto and wherein said second beater means is mounted on a second elongate member disposed transversely of said rotatable shaft means and fixedly connected thereto in non-coplanar relationship with said first elongate member.

16. The invention of claim 15 wherein at least one of said elongate members comprises a relatively flexible elongate member.

17. The invention of claim 15 wherein at least one of said elongate members comprise a relatively rigid elongate member mounted to said rotatable shaft means with an elastic, resilient connection means for permitting movement of said rigid elongate member relative said rotatable shaft means subsequent to said associated beater means striking said adjacent drum head.

18. The invention of claim 1 further comprising first beater means rolling support means for rollingly supporting said first beater means thereon for enabling rolling movement of said first beater means on said adjacent drum head between said first strike and said second strike whereby sliding frictional contact between said first beater means and said adjacent drum head is prevented.

19. The invention of claim 7 further comprising first beater means rolling support means for rollingly supporting said first beater means thereon for enabling rolling movement of said first beater means on said adjacent drum head between said first strike and said second strike whereby sliding frictional contact between said first beater means and said adjacent drum head is prevented.

20. A method of providing multiple drum strikes which are closely spaced in time to a drum head for providing flams and pops using a drum beater assembly having a foot pedal moveable in a first direction and a second direction comprising the steps of:

(a) moving the foot pedal in the first direction until a first beater of the beater assembly strikes the drum head; and (b) continuing to move the foot pedal in the first direction until a second beater of the beater assembly strikes the drum head.

* * * * *